United States Patent [19]

Brainard et al.

[11] 3,925,731

[45] Dec. 9, 1975

[54] DIFFERENTIAL PULSE CODED SYSTEM USING SHIFT REGISTER COMPANDING

[75] Inventors: Ralph Carter Brainard, Holmdel; James Charles Candy, Convent Station, both of N.J.

[73] Assignee: Bell Telephone Laboratories, Incorporated, Murray Hill, N.J.

[22] Filed: Apr. 18, 1974

[21] Appl. No.: 461,878

[52] U.S. Cl....... 325/38 B; 179/15 AV; 179/15 AP; 332/11 D; 340/347 DA

[51] Int. Cl.$^2$ .......................................... H03K 13/22

[58] Field of Search.......... 325/38 R, 38 B, 43, 141; 179/15 AP, 15 AV, 15.55; 332/11 D; 340/347 AD, 347 DA

[56] References Cited

UNITED STATES PATENTS

| | | | |
|---|---|---|---|
| 3,550,004 | 12/1970 | Candy | 325/38 R |
| 3,573,802 | 4/1971 | Kawashima et al. | 340/347 |

OTHER PUBLICATIONS

Digital Companding Device for Delta Modulators–M. Choquet & C. Jacquart, IBM Technical Disclosure Bulletin Vol. 15, No. 7, Dec. 1972 pp. 2054–2055.

*Primary Examiner*—George H. Libman
*Assistant Examiner*—Marc E. Bookbinder
*Attorney, Agent, or Firm*—C. S. Phelan

[57] ABSTRACT

A digital accumulator employing a reversible shift register converts a 1-bit differential pulse code to a logarithmically companded, or n:m, pulse code. The accumulator is coupled through a digital-to-analog converter to a subtraction circuit which also receives an analog signal to be represented in the differential pulse code. Output from the subtractor is integrated and thresholded to produce the differential pulse code. A decoder using the same type of accumulator is also shown.

25 Claims, 12 Drawing Figures

DIFFERENTIAL PULSE CODED SYSTEM USING SHIFT REGISTER COMPANDING

BACKGROUND OF THE INVENTION

1. Field of the Invention

This invention relates to differential pulse code communication systems and it relates, in particular, to a digital accumulator employed in coding and decoding circuits of such systems.

2. Description of the Prior Art

Considerable effort has been expended in the art over many years, since the discovery of delta modulation, to facilitate a realization of the potential benefits of the relative simplicity of coders and decoders, i.e., codecs, using delta modulation principles. In delta modulation type coding, a continuous input analog signal is compared to a feedback discrete analog signal approximation of the input from a prior time interval, and the resulting error signal is sampled for use in producing a digital output that expresses the nature of the difference between the continuous and the discrete analog signals. Some form of analog signal generation and signal integration is employed in a coder feedback path, as well as in a receiving station decoder, to produce the discrete analog approximation from the digital output.

The simplest delta coders are termed 1-bit coders because they put out either a pulse signal state or a no-pulse signal state to indicate whether or not the error signal is positive at the sampling time. Analog integration is usually employed in the feedback path of the simple 1-bit coder, and its output steps up or down by a set amount in response to each digital output. The system is unable to resolve details of the analog input that are smaller than a step size; and, consequently, the steps need to be very small and the sampling rate correspondingly high. A sample rate of 8 or more megahertz is often required to allow the digital signal to track fast variations in analog signals without encountering slope overload distortion. Such analog integrators are known to have difficulty in maintaining a good balance between positive-going and negative-going signal excursions directed by the digital input to the integrator and which excursions are supposed to be of equal magnitude.

A variation on the simple delta modulation coder is a differential coder in which the digital output is a train of multibit pulse coded words. Each word represents one of a limited plurality of different integrator step sizes that can describe the analog signal variations. The differential coder can operate at a somewhat reduced sampling rate as compared to the aforementioned 1-bit coders. Although the resulting signal quality has been good for voice transmissions, the complexity of circuits required for determining which step size to use and for recapturing the analog information from the multibit words has been significant in terms of cost.

Further variation on the differential coder has been the so-called direct feedback coder. This coder still follows the multibit format, but it includes in the forward signal path of the coder an analog integrator for integrating the comparator output signal prior to thresholding. The integrator causes the discrete analog approximation signal from the feedback path to oscillate between levels in a way that keeps its average value equal to the average input. The average output of this circuit over a Nyquist interval resolves details that are much finer than the step size. This process has been called interpolation. However, these prior art coders with interpolation retain the aforementioned problems of analog feedback integrators. In addition they have a strong tendency toward instability if the forward path integrator is effective at high frequencies, e.g., about the coder sampling rate, and has a gain that is high enough for unambiguous response to the smallest step size to yield good interpolation. That is, a lower gain, or a reduction in the upper frequency of the forward integration characteristic, in order to gain stability also causes the coder to track the input analog signal more slowly and create slope overload problems unless the sampling rate is boosted substantially.

Efforts to improve the various types of delta modulation coders have usually focused on such conflicting requirements as reducing the sampling rate, increasing the dynamic range, i.e., the total amplitude range that can be spanned by a single coder, and improving the response to both slowly and rapidly changing inputs. Results from these efforts have not usually been successful in all three areas for a single coder because improvements in one area are often attained at a cost of a setback in at least one other area or in the complexity of the circuit. It is well known that a high sampling rate presses coder circuits and devices toward the limits of their capabilities, but a reduced sampling rate usually means reduced resolution and dynamic range because the coder is unable to track fast variations in analog input signals. Increasing the dynamic range of a coder usually means that it is necessary to increase the sampling rate, or at least suffer a substantial increase in complexity and cost in order to add some form of adaptive function to alter the coder step size when the analog signal rate of change is rapidly changed.

For example, companded systems of the prior art are usually rate-of-analog-change sensitive and do not catch details of small analog signals passing rapidly through zero. Such companded delta modulator systems are not in accord with the amplitude-sensitive companding commonly used for long distance transmission of telephone signals. The result is a significant loss of quality when transforming between the two forms of companding. Furthermore, if an accurate response to slowly varying analog signals is desired, even in rate-of-change companding, it is usually necessary to provide a very fine coder step size. This tends to make the circuits difficult to construct and sensitive to small imperfections.

It is also known, as already mentioned, in 1-bit coders to employ analog signal integration in both the forward path and the feedback path of a coder to enable operation at a relatively low sampling rate. However, the quality of the resulting signal is insufficient for toll telephone service where there are stringent requirements upon coder and decoder insertion gain. The analog integrators are hard to balance for positive and negative step commands as already noted. If companding is to be employed, it usually requires the complexity of analog level sensing, and in some 1-bit coders it requires an extra coding loop. It has also been found that the forward integration must be quite loose, i.e., the integration is effective in only a relatively narrow frequency range, in order to avoid a type of operation in which the output oscillates at an unnecessarily low frequency and thus produces noise in the analog band of interest. Such operation, sometimes called submoding or doublemoding has an effect similar to that of a coder operating at about half the sampling rate. That loose integration also weakens the ability to perform time interpolation and to produce good response to slowly varying input signals, and thus requires a relatively small step size and increased sampling rate.

In a differential direct feedback coder of the 1-bit type, shift registers are used to collect an indication of successive bits of one type and establish a corresponding adapted-step size, positive or negative, for changing the input analog signal. Although the shift registers perform a limited accumulation and provide a rate of change type of companded form of the digital version of the analog signal, the final analog reference resulting therefrom is only a very coarse approximation of the analog input unless the sampling rate is high. This coder also has the disadvantages of the aforementioned companded delta modulators.

Some 1-bit coders of the delta modulation type employ a reversible binary counter in the feedback path for digital accumulation. The counter output is typically converted to analog form in some form of resistance ladder network prior to being compared with the coder input analog signal. No error integration is employed in such coders so they are incapable of time interpolation. Furthermore, the counters must be large enough to provide adequate resolution for analog signals representing human speech that may include either high volume, i.e., loud, talkers or soft talkers; and the construction of resistance ladder networks to convert the accumulated digital information from such large counters to analog form is quite difficult and costly. For example, a 13-stage counter would be needed in a coder to provide adequate resolution for a toll telephone system wherein the insertion gain must be carefully controlled. A shift register has generally not been employed for a similar digital accumulator function because it would have required one register stage per analog signal level, or over 8,000 stages to achieve a resolution equivalent to that of a 13-stage binary counter.

SUMMARY OF THE INVENTION

The foregoing and other problems of the prior art are significantly alleviated in an illustrative embodiment of the present invention in which a 1-bit differential pulse code is converted to analog form by a companded digital integration, i.e., a digital accumulation, followed by a digital-to-analog conversion for producing a discrete approximation of the analog signal represented by the differential pulse code. A companded integration here means one employing nonuniform step sizes and is distinguished from a uniform integration employing uniform step sizes, even though in both cases a compressed code may be employed.

The latter analog signal and the analog approximation thereof are compared; and the resulting error signal is integrated in a tight analog circuit, i.e., an analog integrator having an effective range from a frequency near the low end of the analog band of interest to a frequency near the sampling rate. Periodically samples of the integrated error signal are taken to form the 1-bit differential pulse code.

It is one feature of the invention that the companded digital integration is performed by applying the 1-bit differential pulse code to control the direction of operation of a shift register which is clocked at the periodic sampling rate. The least significant bit stage of the register is biased to inject binary ONEs during one direction of shifting, and the most significant bit stage is biased to inject binary ZEROs during the other direction of shifting.

It is another feature of the invention that forward path integration and shift register accumulation in the feedback permit the 1-bit coder to interpolate in a 3-level fashion, instead of the more usual 2-level fashion, which compensates for the coder's inability to rest at a given level for more than one sampling time, as is done in multibit differential coders.

A further feature is that the employment of a reversible shift register, digital accumulator automatically effects signal companding; and this companding, together with the time interpolation effect, enables the coder to have a degree of resolution which is comparable to that achieved by prior art coders with counting accumulators having in excess of 50 percent more stages than are employed in the shift register and requiring more than 500 times higher precision in an associated resistance ladder circuit for digital-to-analog conversion.

Yet another feature of the invention is that a coder utilizing the aforementioned shift register accumulator is compatible with a digital function for curtailing transmission errors in digital signals as set forth in the copending J. C. Candy application Ser. No. 461,879, filed concurrently herewith, entitled "Circuit for Curtailing Effects of Bit Errors in Pulse Coded Transmission," and assigned to the same assignee as the present application.

BRIEF DESCRIPTION OF THE DRAWING

A more complete understanding of the invention and the various features, objects, and advantages thereof may be obtained from a consideration of the following detailed description in connection with the appended claims and the attached drawing in which:

DETAILED DESCRIPTION

Before describing the invention, it is useful to outline a companding code system frequently used to represent in digital form telephone signals that are to be transmitted over long distances. This same system is involved in operation of the present invention. In the system, logarithmic, base-2, companding is employed in the form of a piecewise linear approximation of the well-known mu-law companding rule by which signal changes at small amplitudes are represented by small steps and changes at larger amplitudes by correspondingly larger steps. In the piecewise linear approximation, the desired amplitude range is divided into a predetermined number of segments. Eight positive and eight negative segments are often encountered in telephone voice and video work and are used here. Each segment is twice as large as the next lower segment in an increasing sequence from small to large magnitudes. Each segment is divided into a common number of intervals of equal size within a segment.

One useful number of intervals in commercial practice, and which is used herein, is sixteen equal intervals per segment. Thus, for example, segment boundaries may be at magnitudes of 0, 1, 3, 7,...($2^n$-1), 255 where $n$ has integer values from zero to eight, units to accommodate signals in the range ±255 units. The smallest interval is then one-sixteenth of the 0-to-1 segment and corresponds to a resolution of better than thirteen bits in a linear pulse code. The same resolution is achieved in the present invention by eight magnitude bits and one sign bit employed in coding and decoding equipment having a capability for interpolating 16 different values between adjacent levels represented by the sign and magnitude bits.

Figures 1, 3:
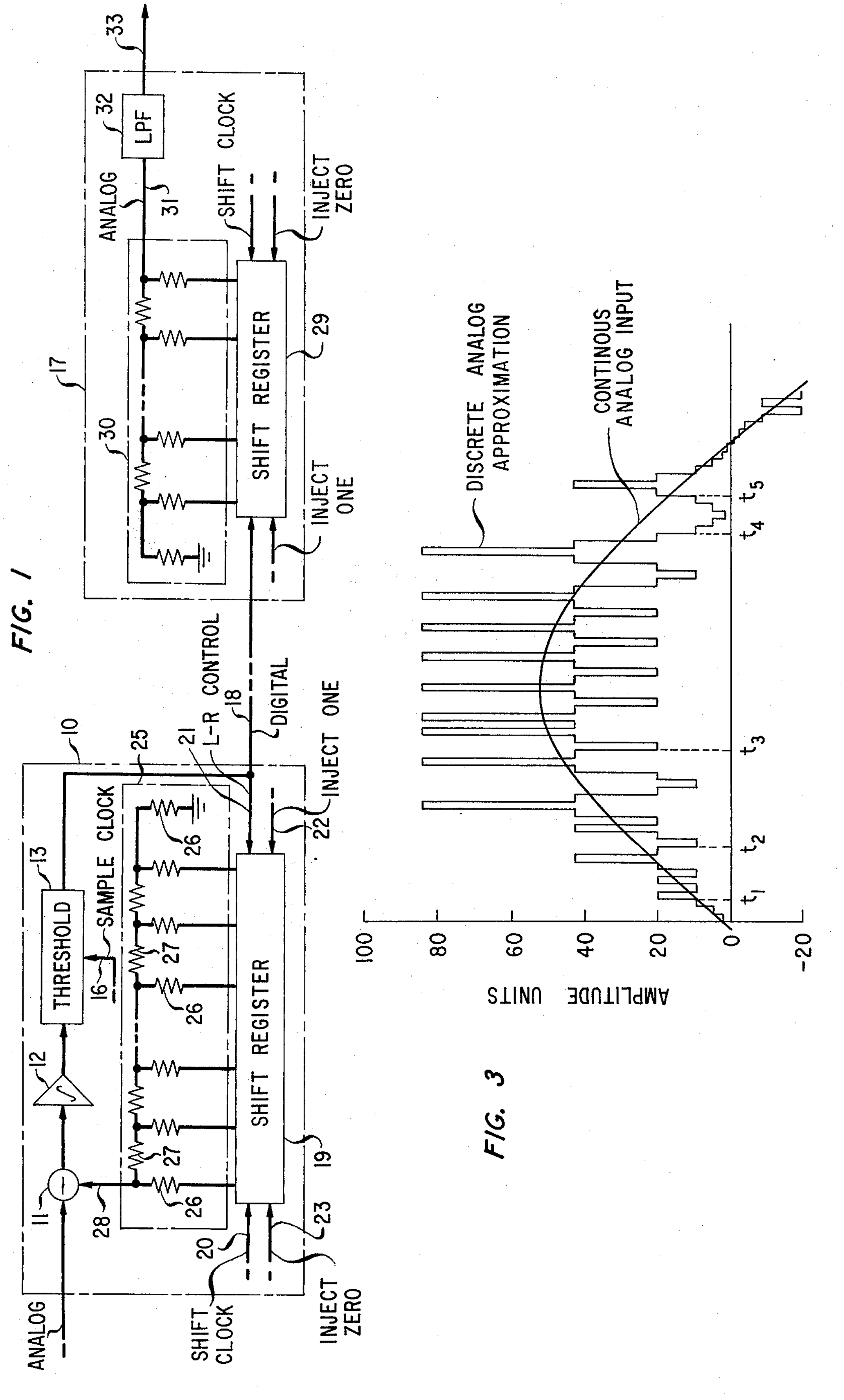
FIG. 1 is a simplified circuit diagram of a differential pulse code system utilizing a digital accumulator according to the present invention.
FIG. 3 includes signal wave diagrams illustrating response of the coder to rapidly changing input analog signals.

FIG. 1 is a simplified block and line diagram of a communication system utilizing accumulation by the shift register companding technique of the present invention. In a coder 10, continuous analog signals are applied to one input of a subtraction circuit 11 to be compared with a discrete analog signal approximation derived from a time portion of the analog signal in a prior time interval. "Discrete" is used because the approximation results from a digital operation and is, therefore, stepped as distinguished from the continuous input to the coder. The resulting difference signal is an error signal and it is coupled through an integrator 12 to an input of a clocked threshold circuit 13. A clocked switch may be included between subtractor 11 and integrator 12 in some applications but it is not necessary for the specific embodiment to be described in FIGS. 2A and 2B. A sample clock signal supplied on a circuit 16 occurs at a sampling rate which is in excess of the Nyquist frequency, i.e., greater than twice the upper band edge frequency of the analog band of interest for continuous analog signals which are anticipated to be provided to the encoder 10. Output signals from the threshold circuit 13 include either a pulse signal or a nopulse signal depending upon whether or not the integrated error signal had a magnitude exceeding the decision level of the threshold circuit.

For toll quality telephonic signals, the sample clock on the circuit 16 is advantageously at a frequency that is twice the product of the Nyquist rate for the continuous analog signal and the number of intervals per segment in an n-segment, mu-law companding arrangement having a degree of signal resolution which is comparable to the degree of resolution desired for a particular coder of the type herein described. The language "degree of resolution" refers to the magnitude of the smallest analog signal excursion that can be accurately represented by the coder digital output. Although the indicated sampling rate is low compared to that employed in many delta modulation type encoders, it is relatively high compared to the Nyquist rate for an analog signal. However, the indicated sampling rate facilitates the employment of a 3-level time interpolation effect, to be described, that makes it relatively easy to eliminate signal transients, both because the frequency components of the transients are shifted far above the analog baseband of interest and because the discrete analog signal approximation must change in every sampling period so that the transients tend to cancel one another. Nevertheless, the coder still must follow the same operational pattern, to be described, at lower sampling rates and it has been found to produce subjectively satisfactory operation at sampling rates as low as 70 kHz for voice signals.

The output of threshold circuit 13 is a pulse train, as previously mentioned, and represents a succession of amplitude difference information signal bits describing the continuous input analog signal to the coder 10. This coder digital output is the signal which is advantageously transmitted to a remote receiving station decoder 17.

In the coder 10, the digital signal train from threshold circuit 13 is also applied for controlling the direction of operation of a reversible shift register 19 which receives shift clock signals from a circuit 20 at a frequency which is equal to the frequency of sample clock signals applied on the circuit 16. This directional control is such that the application of a pulse on the control lead 21 causes the register 19 to shift the contents thereof from right to left, as illustrated in the drawing. As will subsequently become evident, that direction represents a shift from the least significant bit stage of the register toward the most significant bit stage thereof. Similarly, in the absence of a pulse on the lead 21, the register 19 responds to shift clock pulses by shifting its contents from left to right, i.e., from the most significant bit stage toward the least significant bit stage. At all times during the operation of the shift register 19, its least significant bit stage is biased by a circuit 22 for injecting binary ONE signals into the register during left shift operations. Likewise, the most significant bit stage of the register is continuously biased by a circuit 23 to inject binary ZERO signals into the register during right shift operations.

Register 19 includes a number of stages which is equal to the number of analog signal amplitude levels corresponding to segment boundary levels in the mentioned mu-law companding arrangement for an amplitude signal range which is sufficient to embrace all input analog signal amplitudes of interest and of one polarity. Intervals within segments are not specifically identified in the code stored in register 19. The manner of handling bipolar signals will be described in connection with the schematic detail of the coder as shown in FIG. 3. The result of the shift register arrangements just described for register 19 is that the register contents can change by only one bit in each coder sampling time, and they must change in every sampling time. In addition, the register always includes n binary ONES adjacent to one another at the least significant portion of the register, and m binary ZEROS adjacent to one another in the remainder of the register. The ratio n:m varies according to the way in which the input analog signal varies for thereby causing different patterns of pulses in the digital output signal of threshold circuit 13. However, each digital word representation contained in register 19 at any given time represents in binary coded format one of the different segment boundary amplitude values from the least (all-ZERO) to the greatest (all-ONE) in the mu-law companding range of the coder. Thus, for example, segment boundaries representing analog levels of 0, 1, and 3 are n:m code characters as follows, respectively:

00000000
00000001
00000011

It can be seen from the foregoing that shift register 19 accumulates continuous analog increase and decrease information. That accumulated result is achieved directly in compressed code form, and the combination therewith of time interpolation makes it unnecessary to use extra compressed code bits to specify interval number. Consequently reconversion to discrete analog requires relatively few resistors and is done with an R/2R resistance ladder as will be described. Furthermore, the compressed code used is compatible with the companding code system previously described, which is used commercially for long distance telephonic signal transmission, because it is amplitude sensitive rather than rate of change sensitive.

Like outputs from different stages of the shift register 19 are utilized to apply a voltage drive to an R/2R type of resistance ladder network 25. That is, the shift register outputs are coupled through tap, or rung, resistors to equally spaced, resistance-wise, circuit points on a potential divider forming one beam of a ladder. Thus, the ladder network includes rung resistors 26, which in FIG. 1 all have the same resistance 2R, and beam resistors 27, which all have the same resistance R.

A lead 28 couples the most significant bit end of the resistance ladder network 25 to an input of the subtraction circuit 11 for supplying the aforementioned discrete analog signal approximations thereto for comparison with the continuous analog input signal to the coder. Shift register stage supply voltages are selected so that each stage supplies the same output voltage for a corresponding binary signal state in such stage. That common level is selected in proportion to the resistances R and 2R of the latter network so that each binary coded word that can appear in the register 19 causes a different analog signal level to be produced on the circuit 28. The latter analog signal levels do not represent the aforementioned segment boundary levels of the mu-law companding system but are shifted therefrom by an amount to satisfy two requirements. The first of these two requirements is that each pair of adjacent discrete analog signal levels on the lead 28 must bracket one of the aforementioned boundary levels and be equally spaced in amplitude therefrom so that the average value of the consecutive two levels on lead 28 is equal to the bracketed segment boundary level. The second requirement for the signal levels on lead 28 is that in the sequence of levels, from the smallest to the largest in the range of interest, they are spaced from one another by amounts which increase in binary weighted fashion, that is, the spacings between adjacent levels are 1, 2, 4, 8, et cetera. Accordingly, the discrete analog signal levels on lead 28 are advantageously proportional to the values ±1/3, ±1⅔,...±($2^n$/3 −1), where $n$ has integer values from 2 to 10 for the previously mentioned code segment boundary levels from 0 to 255. Thus, the average value of +⅓ and −⅓ is the value 0; the average of +⅓ and +1⅔ is 1; the average of +1⅔ and +4⅓ is 3; and so forth.

It will subsequently be shown in connection with FIG. 3 that for a rapid input analog signal change the feedback discrete analog signal approximation steps up or down successively to track the input analog signal. If the feedback signal steps too far, it backs off during the next sampling time to adjust the average value. Thus, an increasing continuous analog signal that is larger than the discrete feedback produces a positive error signal from the subtraction circuit 11 to the integrator 12. Threshold circuit 13 is actuated by integrator output to produce a pulse for transmission on circuit 18 and for directing a left shift in the register 19. That shift produces an additional binary ONE in the right-hand portion of the register and thereby increases the discrete analog signal on lead 28 to the next higher level in an effort to track the input continuous analog signal. If this step is large enough to exceed the input analog signal, because the input is either increasing more slowly or decreasing, the difference signal from subtraction circuit 11 is negative and the output of integrator 12 is reduced. If the reduction is sufficient, threshold circuit 13 is not operated during the next sample clock time, no pulse is applied on the direction control lead 21, and the shift register 19 shifts to the right. This reduces the number of binary ONES in the register and thereby reduces the discrete analog signal on lead 28 to the next lower level.

Should the continuous analog signal to the coder remain relatively steady at any level, including the zero amplitude level, the discrete signal on circuit 28 is caused to jump back and forth between its output levels which bracket that analog value. If that input continuous analog value is not at a segment boundary of the mu-law companding system, i.e., if it is not equal to the average value of the two bracketing discrete levels, an error signal of appropriate polarity builds up in the integrator 12 and eventually causes shift register 19 to change the discrete analog signal on lead 28 to a third level outside of the bracketing levels every once in awhile in order to reduce the integration error and thereby more closely approximate in the average the continuous analog signal to the coder.

Satisfactory stability and time interpolation are realized in the embodiment of FIG. 1 with modest gain and integration characteristics. Gain is advantageously set at a level which is at least sufficient to cause a lead 28 discrete approximation step of the smallest size to produce at the input to threshold circuit 13, assuming a constant continuous analog input, a signal change that is much larger than the range of possible variation in the decision threshold of circuit 13. Integrator 12 advantageously has a substantially uniform integration characteristic, i.e., gain down by half for each doubling of frequency, from the lowest frequency of interest in the continuous analog signal, e.g. 100 Hz, to the coder sampling frequency, e.g., 256 kHz.

Digital output of the coder 10 in FIG. 1 is a sequence of single pulses, as already mentioned, for transmission to the decoder 17. In that decoder the pulses are applied to the direction control input of a further reversible shift register 29 which has its respective stage outputs coupled through an R/2R resistance ladder network 30, all as in the corresponding shift register and ladder network of the coder 10, for reconstructing on a circuit 31 another discrete analog signal approximation. A low-pass filter 32, with a cutoff frequency at the upper edge of the baseband analog signal band of interest, applies the analog approximation from circuit 31 to an output circuit 33, while at the same time smoothing the high frequency discrete analog step variations to reproduce the baseband analog signal. Shift register 29 includes the same provisions as the register 19 for injecting binary ONES at the least significant bit stage and binary ZEROS at the most significant bit stage. Likewise, register 29 is provided with a shift clock that is synchronized (by circuits not shown) to the bit frequency of the digital signal.

In addition, for the embodiment shown in FIG. 1, any particular message transmission between coder 10 and decoder 17 should be preceded by a short synchronization interval. In that interval a central control (not shown) for the system would effect the synchronization, for example, by holding the input analog signal to the coder 10 higher than its highest anticipated level. Such operation forces the storage in both of the shift registers 19 and 29 of binary ONE signals in every stage so that the contents of the two shift registers are thereby also synchronized.

An alternative form of digital output from the encoder 10, or decoder 17, is advantageously the bit-parallel compressed binary coded words contained in shift register 19, or register 29 respectively. This companded form can be translated to a more conventional linear pulse code modulation format for processing or further transmission if appropriate logic circuits are available.

Figures 2A, 2C:
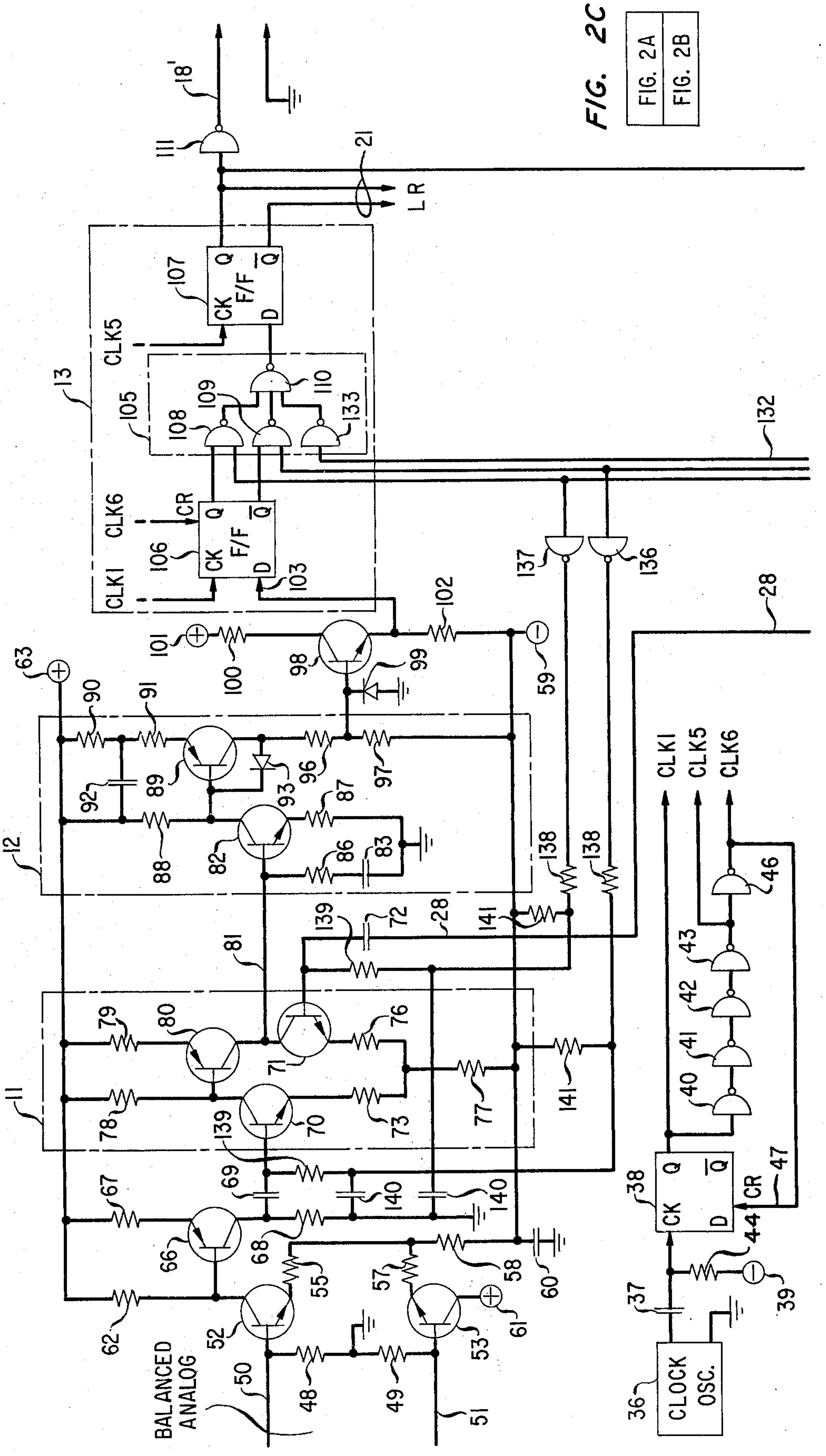
FIGS. 2A and 2B are, when arranged as shown in FIG. 2C, a schematic diagram of the coder in the system of FIG. 1.
Figure 2B:
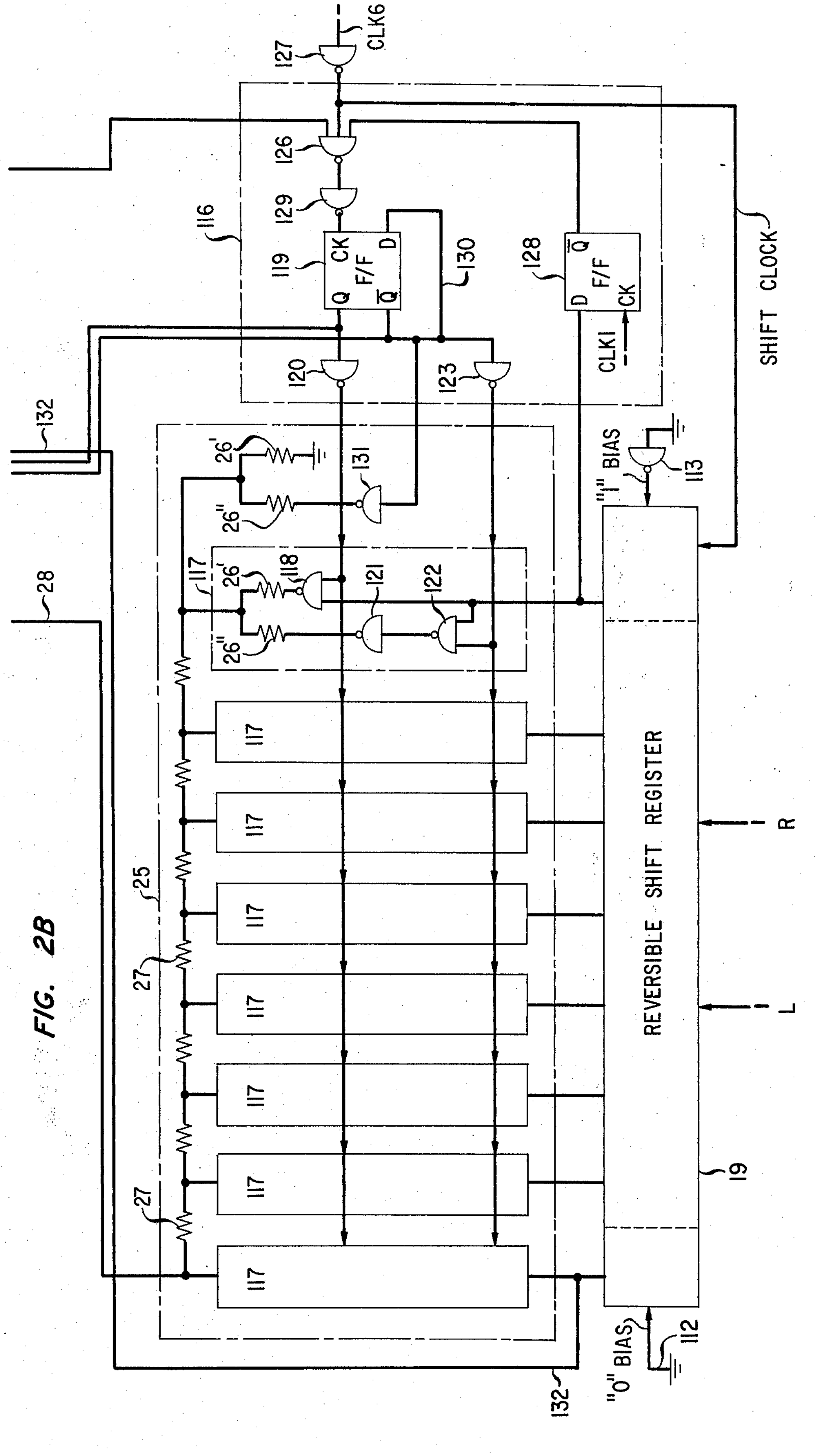

In FIGS. 2A and 2B there is illustrated a schematic diagram of one implementation of the FIG. 1 coder. The coder of FIGS. 2A and 2B will be discussed prior to examining more closely some of the featured aspects of coder operation.

A clock oscillator 36, of any convenient type known in the art, provides time base signals with respect to ground from which sample clock signals and shift clock signals, as well as other timing signals which might be required, can be derived. The output of oscillator 36 is applied through a coupling capacitor 37 to a toggle, or clock, input connection of a bistable trigger circuit 38. The latter circuit is advantageously a D-type flip-flop circuit, and it is arranged in the usual manner when enabled by a clock pulse to assume a stability state corresponding to the binary state of an input signal at the data, or D, input of the circuit. However, such a data input is not employed for the flip-flop circuit 38 since the input is allowed to float; and consequently, the internal bias of the D flip-flop functions, in a manner well known in the art, to drive the flip-flop circuit into the set state in response to each clock pulse.

True and complement forms of binary output signals indicating the flip-flop circuit 38 state are produced at Q and $\overline{Q}$ outputs of the flip-flop. Thus, in response to a clock pulse, the flip-flop circuit is set, and the Q output assumes a high binary ONE signal voltage condition as compared to a relatively lower signal condition at the $\overline{Q}$ output. Flip-flop circuits of this type also conventionally have preset, and clear, CR, input connections which can be actuated by negative-going input signal transitions to establish corresponding stable states in the flip-flop whether or not an enabling clock pulse is present. One commercially available D flip-flop circuit, which is advantageously employed for the flip-flop circuit 38 and for other D flip-flops to be mentioned in connection with FIGS. 2A and 2B, is included on a Texas Instruments Company integrated circuit chip type SN7474 which is described and illustrated at pages 6–55 to 6–57 of the Texas Instruments equipment catalog entitled "Integrated Circuits for Design Engineers," and numbered CC-401, 10072-41-US.

The clocking input, CK, of flip-flop circuit 38 is also connected to receive the output of a source 39 of negative voltage by way of a resistor 44. The source 39 and other similar operating potential sources in the present drawings are schematically represented by a circled polarity sign at the circuit point to which a terminal of the indicated polarity of an appropriate direct current potential supply is connected. A terminal of the opposite polarity of such a supply is assumed to be connected to ground. The connection of source 39 keeps the flip-flop circuit 38 biased to its most sensitive region and thus responsive to small inputs. For this purpose the current in resistor 44 due to source 39 is made equal to one-half the current needed to hold the clocking input at ZERO.

A CLK 1 signal is the Q output of the flip-flop circuit 38. Other clock signals of the same frequency, but differently delayed with respect to the CLK 1, are derived through different numbers of cascaded single-input inverters, or NAND gates. In the illustrative embodiment, five gates 40, 41, 42, 43, and 46 of any suitable type each responds to either a high or a low input signal to produce either a low or a high output signal, respectively. A CLK 5 time base signal is obtained from the output of the gate 43 and is delayed by four gate delay times with respect to the CLK 1 signal. A CLK 6 output is derived from the output of gate 46 after one additional gate delay. The latter clock signal is also coupled by way of a lead 47 to reset the bistable circuit 38 five gate delay times after it has been set. The width of the clock pulse generated is about seven gate delays.

In the coder of FIGS. 2A and 2B, the continuous analog signal which is to be encoded is supplied on leads 50 and 51 in balanced format to series-connected resistors 48 and 49 which have the intermediate circuit point therebetween connected to ground. The same analog signal on leads 50 and 51 is applied to base terminals of a pair of n-p-n transistors 52 and 53 which are connected in a circuit configuration for converting the balanced analog signal to unbalanced form with respect to ground. To this end, emitter terminals of transistors 52 and 53 are coupled by way of individual emitter resistors 55 and 57 and a common emitter resistor 58 to a source 59 of negative potential. That source is provided with a bypass capacitor 60 to ground. The collector terminal of transistor 53 is connected directly to a source 61 of positive potential; and the collector terminal of transistor 52 is connected through a resistor 62 to a source 63 of positive potential. These arrangements hold transistors 52 and 53 continuously in their linear range of operation.

Unbalanced analog signals at the collector terminal of transistor 52 are applied to a base terminal of a p-n-p transistor 66 which is arranged in a common emitter amplifier stage in which its emitter electrode is coupled by a resistor 67 to the source 63, and its collector terminal is connected to ground through a load resistor 68. The stage of transistor 66 provides gain corresponding to the resistance ratio R68:R67. All of the transistors 52, 53, and 66 operate in the linear portions of their operating characteristics in all phases of normal operation of the coder.

Signals at the collector electrode of transistor 66 are applied by a coupling capacitor 69 to an input base terminal of an n-p-n transistor 70 in the subtraction circuit 11. Transistor 70 is connected with a further n-p-n transistor 71 in a linear differential amplifier configuration for performing the signal subtraction function. A coupling capacitor 72 supplies to the base terminal of transistor 71 the discrete analog signal approximation from the output lead 28 of the coder feedback path. Resistors 73 and 76 couple emitter terminals of transistors 70 and 71 to one terminal of a common emitter circuit resistor 77 which has its other terminal connected to the negative source 59. A collector terminal of transistor 70 is coupled to the positive source 63 through a collector load resistor 78, and the collector terminal of transistor 71 is connected to the same source through a resistor 79 and a p-n-p transistor 80 which has its base terminal connected to the collector terminal of transistor 70. Transistors 70, 71, and 80 operate normally in the linear portions of their respective characteristics for performing the differential amplifier function without driving either of the transistors 70 or 71 into a nonconducting state.

A lead 81 couples the collector terminal of transistor 71 to a base terminal of a transistor 82 in the integrator 12. Integration is performed by a shunt connected capacitor 83 which has one terminal connected to ground and the other terminal connected through a small stabilizing resistor 86 to the lead 81. Capacitor 83 is charged and discharged by way of collector circuits of transistors 80 and 71, respectively, to prevent undue leakage of the capacitor charge through the bias supply for transistor 71. The resistance of resistor 86 is chosen as described, for example, in the copending application of J. C. Candy Ser. No. 305,977, filed Nov. 13, 1972, and now U.S. Pat. No. 3,820,111, to achieve an optimum stability condition for the coder. Resistor 86 introduces an anticipatory voltage drop in the integrator to allow threshold circuit 13 to respond promptly to changes in the direction of charge of capacitor 83. Capacitor 83 and resistor 86 together have an integration time constant which is approximately equal to one period of the clock 1 signal, which corresponds to the coder sampling frequency. The frequency range of an intended input voice band signal is 100 Hz to 4 kHz, and the sampling or coder cycle, rate is 256 kHz. The range of the analog integration provided by capacitor 83 is about 100 Hz to 256 kHz. The lower frequency is determined by the time constant of capacitor 83 in combination with spurious leakage introduced by collector impedances of transistors 80 and 71 and base impedance of transistor 82. The upper integration limit is determined by the time constant capacitor of 83 and resistor 86.

Transistor 82 is connected as a common emitter amplifier and operates in its linear range to provide a high impedance load for coupling the integrated error signals appearing across resistor 86 and capacitor 83 to another p-n-p transistor 89 with amplification. The latter transistor is connected in a common emitter amplifier circuit and provides isolation and additional gain. A resistor 87 connects the emitter terminal of transistor 82 to ground and a resistor 88 couples the collector terminal to source 63. The p-n-p transistor 89 has its base terminal connected to receive signals from the collector terminal of transistor 82 and its emitter terminal connected through two series connected resistors 90 and 91 to the positive source 63. The biasing resistor 90 is bypassed by a capacitor 92. A diode 93 is connected between collector and base terminals of transistor 89 and is poled for forward conduction from the collector to the base to clip very large positive excursions on the collector of transistor 89. Potential divider resistors 96 and 97 connect the collector terminal of transistor 89 to the negative source 59 and have an intermediate terminal directly connected to a base electrode of a common emitter connected n-p-n transistor 98. The emitter follower connection of that transistor presents a low impedance to the D input of a flip-flop circuit in threshold circuit 13. A diode 99 also connected between the same base terminal and ground is provided for clipping negative-going base signals to avoid application of excessive negative-going signals to transistor 98. A resistor 100 connects the collector terminal of transistor 98 to a positive source 101, and a resistor 102 connects the transistor emitter terminal to negative source 59. A lead 103 applies the emitter terminal signal of transistor 98 to an input of the threshold circuit 13.

The threshold circuit 13 includes two cascaded D flip-flop circuits 106 and 107 which are clocked in different phases. Flip-flop circuit 106 receives at its D input the amplified and integrated error signal and receives at its clocking input the clock 1 time base signal. Q and Q outputs of flip-flop 106 are coupled through inverting logic 105, which includes a set of NAND logic gates, to the D input of flip-flop circuit 107. That logic 105 includes a pair of 2-input NAND gates 108 and 109 which are operated by the Q and $\overline{Q}$ outputs of flip-flop circuit 106, respectively. Those gates are further enabled by outputs of polarity responsive logic, as will be subsequently described, for inverting the digital output of the coder when the polarity of the coder input continuous analog signal changes. A 3-input NAND gate 110 receives the outputs of gates 108 and 109 as well as a shift register overflow detecting signal as will be subsequently described. Thus inverting logic 105 functions somewhat as EXCLUSIVE OR logic for selectively inverting the digital signal train in the coder forward signal path.

The flip-flop circuit 107 is enabled by each CLK 5 time base signal to be operated by the digital signals provided by gate 110. On each CLK 6 signal the flip-flop circuit 106 is cleared so that at the beginning of each sample time it will operate from the same bistable state and thereby minimize the effect of temperature variations on the flip-flop triggering characteristics. The regeneration of the digital signal by flip-flop circuit 107 eliminates pulse-width modulation effects that can appear in the output of flip-flop circuit 106, as a result of triggering that circuit by an analog error signal that may actually have an amplitude which is close to the decision threshold of the flip-flop circuit. It can thus be seen that the Q output of the flip-flop circuit 107 reproduces in true form the digital signals at the output of flip-flop circuit 106 when NAND gate 108 is enabled by the polarity control information. However, the digital signals at the Q output of flip-flop 107 represent the complement of the digital signal when the NAND gate 109 is enabled by the polarity information. A further NAND gate 111 is of the single input type, and it isolates and inverts the Q output of flip-flop circuit 107 for application to the coder digital output circuit 18'.

The Q and $\overline{Q}$ outputs of flip-flop circuit 107 are also coupled to leads designated R and L, respectively. These leads correspond to control lead 21 of FIG. 1 and extend the double-rail logic form of the coder digital output to the correspondingly designated direction control inputs of shift register 19 in FIG. 2B. A high Q signal on the R lead directs the shift register 19 to shift toward the right, i.e., toward its least significant bit stage, on each shift pulse in the pulse train of CLK 5. Similarly, a high $\overline{Q}$ output of flip-flop circuit 107 causes shift register 19 to shift to the left toward its most significant bit stage. CLK 6 is inverted by NAND gate 127 prior to application to register 19 to allow an extra interval, i.e., one more gate time, of delay for the output of threshold circuit 13 to settle. Shift register 19 is provided with a ground connection 112 for injecting ZEROs at the most significant bit stage during right shift operations. Similarly, a ground connection is provided through a NAND gate 113 to the least significant bit stage for injecting ONEs during left shift operations. Typical commercially available reversible shift registers include internal logic which causes the signal injecting connections 112 and 113 to be effective during only the appropriate direction of shifting.

The illustrative embodiment of FIGS. 2A and 2B is arranged to accommodate bipolar analog signals. For this purpose the connections from the respective shift register 19 stage outputs to corresponding tapping points along the potential divider of resistors 27 include facilities for applying to such tapping points either the true form or the complement form of the shift register output. Selection of the proper form is controlled by polarity responsive logic 116. Each of plural tap logic blocks 117 includes rung resistors of the resistive ladder network and is the same so only one is illustrated in detail. This is the one at the least significant bit stage of shift register 19. A NAND gate 118 couples the shift register output through a resistor 26′ to the least significant bit end of the ladder network for producing negative analog signal steps on lead 28. This gate is further enabled by the Q output of a further D-type flip-flop circuit 119 in the polarity logic 116 after inversion of that output by a NAND gate 120. The same output of shift register 19 is also coupled through coincidence logic and a rung resistor 26″ to the same tap of the ladder network for producing positive discrete analog signals on lead 28. In this case the coincidence logic is provided by a single input NAND gate 121 which is actuated by the output of a 2-input NAND gate 122 that is, in turn, actuated by the shift register output. The tandem NAND gates were employed instead of a single AND gate, since ample 2-input NAND gates for 118 and 122 happened to be available on a commercially available integrated circuit logic card of a type which was utilized throughout the implementation of the illustrative embodiment. Gate 122 is enabled by the $\overline{Q}$ output of flip-flop circuit 119 after the inversion of that output in a NAND gate 123. Since resistors 26′ and 26″ are in effect connected in parallel, each has a resistance four times each of the resistors 27 in order to preserve the R/2R type of ladder network operation.

Turning now to the polarity responsive logic 116, each coder digital output pulse at the Q output of flip-flop circuit 107 operates a 3-input NAND gate 126 if such gate is at that time also enabled by the inverted CLK 6 signal and by the $\overline{Q}$ output of a D flip-flop circuit 128. The latter circuit is enabled by the CLK 1 signals to respond to the same least significant bit output of the register 19 which was used to drive the described least significant bit tap logic circuit 117. Inversion of the CLK 6 signal is utilized to be certain that gate 126 cannot be actuated until the output of the flip-flop circuit 107 has stabilized.

The $\overline{Q}$ output of flip-flop circuit 128 is low to disable gate 126 at all times, except when a binary ZERO is stored in the least significant bit stage of register 19. The latter condition indicates that the shift register is in the all-ZERO state, i.e., it could underflow if an additional right shift is directed. Such a condition indicates that tha analog input to the coder could be about to cross the zero amplitude axis and reverse polarity. The appearance of such a binary ZERO in the shift register 19 resets the flip-flop circuit 128 to drive the $\overline{Q}$ output to its high binary state and thereby enable gate 126. At this time the occurrence of a pulse on the R lead in the coder output, which pulse normally commands a ring shift operation, and appearance of an inverted CLK 6 pulse, completes actuation of gate 126 to produce a low output that is inverted by a single-input NAND gate 129 for enabling the clock input to flip-flop circuit 119. That flip-flop circuit includes a connection 130 from its $\overline{Q}$ output to its D input so that whenever the flip-flop circuit receives an enabling clock signal it switches to its opposite stability condition.

Q and $\overline{Q}$ outputs of flip-flop circuit 119 are coupled, respectively, in inverted form to inputs of all gates 118 and all gates 122 in tap logic circuits 117. Inverting gates 120 and 123 provide isolation. Thus, the outputs of flip-flop circuit 119 select either the true or the complement output of shift register 19 and that selection is changed each time flip-flop circuit 119 is toggled as just described. Those same Q and $\overline{Q}$ outputs are applied without inversion to control NAND gates 109 and 108, respectively, in the threshold circuit 13 in FIG. 2A. Thus, when the Q output goes low indicating negative polarity, it selects the complemented outputs of shift register 19 for conversion to discrete analog form on lead 28, and it also disables gate 109 while the $\overline{Q}$ output enables gate 108. Consequently, the true form of the coder digital output is coupled through NAND gate 110 for operating flip-flop circuit 107. Similarly, a low $\overline{Q}$ output on flip-flop 119 selects the true output of register 19 and the complement form of coder digital output. Each time the polarity flip-flop circuit 119 is toggled, the coder digital output is complemented, the output of shift register 19 to the resistive ladder network is complemented, and the shift register direction command effects with respect to the output of threshold flip-flop circuit 106 are inverted to drive the discrete analog approximation on lead 28 away from the analog zero amplitude axis. Thus, polarity reversal in the continuous input analog signal to the coder is followed by polarity reversal of the discrete analog approximation on lead 28.

In addition to the foregoing operations, the $\overline{Q}$ ouput of the polarity flip-flop circuit 119 in FIG. 2B is inverted by a NAND gate 131 for application through a further resistor 26″ to the least significant bit end of the resistive ladder network. That same terminal of the network is also coupled to ground through another resistor 26′. Thus, when the polarity flip-flop circuit 119 is toggled to the set state, indicating a change from negative to positive on lead 28, its low $\overline{Q}$ output is inverted by gate 131 to apply a supplementary drive signal to the ladder network. This supplementary signal pushes the analog approximation across the zero axis in a positive-going direction when switching from the complement form to the true form of the shift register 19 output. That is, the supplemental signal provided by gate 131 supplies to the ladder network a signal which represents the step from $-\frac{1}{3}$ to $+\frac{1}{3}$ on lead 28.

Summarizing the polarity operation, flip-flop circuit 119 is in its reset state for a negative digital signal approximation. Its high $\overline{Q}$ output disables all gates 122 so all gates 121 provide low outputs to resistors 26″. However, all gates 118 are enabled and supply low or high outputs to resistors 26′ as determined by corresponding high or low outputs from respective stages of register 19. When the digital approximation goes positive, flip-flop circuit 119 is toggled; and its low $\overline{Q}$ output enables all gates 122 so all gates 121 provide low or high outputs to resistors 26″ as determined by corresponding low or high outputs from respective stages of register 19. However, all gates 118 are disabled and provide high outputs to resistors 26'.

A correlative to the polarity change operation just described is overflow protection for the shift register 19, That is, protection which keeps the shift register from mindlessly continuing to shift left in response to an extraordinarily large positive analog input signal. To this end the most significant bit stage of register 19 is provided with a lead 132 for connecting the output of that stage through a NAND gate 133 in FIG. 2A to an enabling input of the gate 110 in threshold circuit 13. When shift register 19 attains the all-ONE condition, its high output on lead 132 is inverted by gate 133 to disable NAND gate 110 and thereby apply a high input to the flip-flop circuit 107 regardless of the coder digital signal state, and regardless of the state of the polarity flip-flop circuit 119. This action pulses the right shift lead from the output of flip-flop circuit 107 and thereby forces the injection of a binary ZERO into the most significant bit stage of register 19 so that the discrete analog approximation is correspondingly reduced. The next following coder output bit again restores the all-ONE's condition if the continuous analog input signal has not theretofore been sufficiently reduced in amplitude. The coder continues to hunt back and forth between its two uppermost discrete amplitude levels until the input analog signal comes back toward zero by a sufficient amount. The untoward input excursion is thereby clipped in the approximation at both the coder and the decoder. In addition, however, the hunting action assures preservation of a fixed relationship between digital approximation level numbers and the coder time base to facilitate curtailing of transmission error effects as will be subsequently described.

A still further utilization is advantageously made of the output of the polarity flip-flop circuit 119. The Q and $\overline{Q}$ outputs are inverted by NAND gates 136 and 137 in FIG. 2A for application through low-pass filters to the base connections of transistors 70 and 71 in the subtraction circuit 11 in order to bias those transistors into a region of linear operation by means of a very low frequency feedback. Notice that the signal feedback via lead 28 is a coupled by a capacitor 72. Also the input signal is a coupled by capacitor 69. Direct current level is established by the connection via resistors 138. Each lowpass filter is in a T-section form including two series path resistors 138 and 139, and a capacitor 140 connected in a shunt path to ground from the intermediate terminal between resistors 138 and 139. Each filter also includes a shunt bias path resistor 141 from the same intermediate terminal of its respective filter to the negative source 59 for providing base terminal bias to transistors 70 and 71. Such bias causes the outputs of gates 136 and 137 to be applied approximately symmetrically with respect to ground. These filters have a high frequency cutoff well below the lowest frequency of the input analog signal, and they perform a so-called "bang-bang" servo function. That is, they force the coder feedback loop toward a change of sign in the discrete analog approximation if the coder input should be zero or be small for an excessive time. The servo action forces the system to a bias state where it spends half time positive and the other half negative so that the reproduced analog is quiet if the speaker is quiet.

In one coder constructed and operated in accordance with the illustrations of FIGS. 2A and 2B for voice signals, the clock oscillator 36 was operated at a 256 kHz rate. This operation produced results which were satisfactory for toll telephone operation, but it was found that subjectively satisfactory operation resulted even when the oscillator rate was reduced to a frequency as low as 70 kHz. In that embodiment, device values employed were as follows:

| | |
|---|---|
| R27 | 600 ohms |
| R26' and R26'' | 2400 ohms |
| R48 and R49 | 330 ohms |
| R55 and R57 | 1000 ohms |
| R58 | 2700 ohms |
| R62 | 2200 ohms |
| R67 | 1200 ohms |
| R68 | 560 ohms |
| R73 and R76 | 270 ohms |
| R77 | 4700 ohms |
| R78 | 2200 ohms |
| R79 | 1800 ohms |
| R86 | 560 ohms |
| R87 | 4700 ohms |
| R88 | 2200 ohms |
| R90 | 680 ohms |
| R91 | 270 ohms |
| R96 | 2200 ohms |
| R97 | 8200 ohms |
| R100 | 100 ohms |
| R102 | 6800 ohms |
| R139 | 1200 ohms |
| C37 | 0.1 microfarad |
| C60 | 100 microfarads |
| C69 | 5 microfarads |
| C83 | 0.007 microfarad |
| C92 | 1 microfarad |
| C140 | 100 microfarads |
| T52, T53<br>T70, T71<br>T82, T98 | Western Electric<br>type 66F |
| T66, T80, T89 | Texas Instruments<br>type 2N4121 |
| 1-input NAND gates | Texas Instruments SN7404 |
| 2-input NAND gates | Texas Instruments SN7400 |
| 3-input NAND gates | Texas Instruments type SN7410 |
| Shift Registers | Texas Instruments type SN74198 |
| D-type bistable flip-flop circuits | Texas Instruments type SN7474 |

Circuits in a communication system receiving station for decoding differential pulse coded signals provided by the coder of FIGS. 2A and 2B are similar to the feedback circuits of that coder and thus are not illustrated again. Accordingly, the pulse coded signal train in the decoder provides direction control information to the decoder shift register and also provides an input to polarity logic, such as the logic 116 in FIG. 2B. Output of that logic is used to provide sign input to a digital-to-analog converter, if the analog form is reproduced at the decoder, as shown in FIG. 2B. However, no outputs from such logic are required in the decoder for a bang-bang servo or for inverting the digital signal train.

FIG. 3 illustrates superimposed wave diagrams for a coder continuous analog input signal and discrete analog approximation signal. The wave diagrams represent plots of amplitude on a linear arbitrary unit scale against time. A number of interesting characteristics can be observed in these superimposed wave diagrams. For example, it is apparent that the step sizes in the discrete analog approximation are smallest for amplitudes near the zero axis and increase as the amplitude increases, i.e., ⅓, 1⅔, 4⅓, 9⅓, 20⅓, etc., units. This reflects the digital companding previously indicated in connection with the operation of shift register 19 in the coder feedback path.

It will also be seen that starting from the left, i.e., zero time point in the diagram, the continuous analog signal is greater than the approximation at the early decision times; and the analog approximation steps up every sample time until the fourth sample time beginning at time *t*1. At that point the discrete approximation prior to time *t*1 is above the input analog waveform but the approximation steps up nevertheless. This action results from the fact that the integrated error signal from prior sample periods, when the continuous analog signal was the larger one, is not immediately offset by the relatively short time before the *t*1 decision when it was the smaller. Such operation ensures that the average value of the discrete signal equals the average continuous analog signal. A similar apparent excursion in the incorrect direction by the approximation occurs in the negative-going direction at time *t*2; and other seemingly incorrect excursions in one direction or the other occur at several other places in the diagram. These excursions represent different examples of the 3-level type of interpolation previously mentioned in connection with FIG. 1 for slow inputs.

At time *t*3 it can be seen that the input analog signal is beginning to level off at amplitudes in the low to middle 40s. Here again is evidence of the 3-level type of interpolating operation in that the coder discrete approximation normally moves between its steps at 41⅔ and 84⅓ amplitude units, respectively, for such an analog signal. However, occasional negative-going excursions outside of those bracketing amplitude levels to the level 20⅓, such as the excursion at time *t*3, are required in order to force the average value of the approximation to conform more closely to the input continuous analog value.

Between times *t*4 and *t*5 there is a period of possible instability in the coder following the discrete approximation excursion to the 84⅓ level, while the input analog signal was at a level of about 30 units with negative slope. Although it is possible that the excursion between time *t*4 and *t*5 is a more complicated extension of 3-level interpolation to offset the aforementioned positive-going excursion, it could also be a case of instability in the coder operation. Even in the latter case, it is apparent that the coder recovered rapidly from the possible instability in a time interval of only about five sample times, which is a relatively short time in terms of the Nyquist period of the input analog signal. Experience with the illustrated coder has indicated that excursions such as that between times *t*4 and *t*5 rarely occur for the indicated analog signal configuration, but that, assuming instability, they represent the worst case encountered; and such excursions are smoothed out in the low-pass filter 32 and are not heard in the reproduced voice signal at a decoder output.

Figure 4:
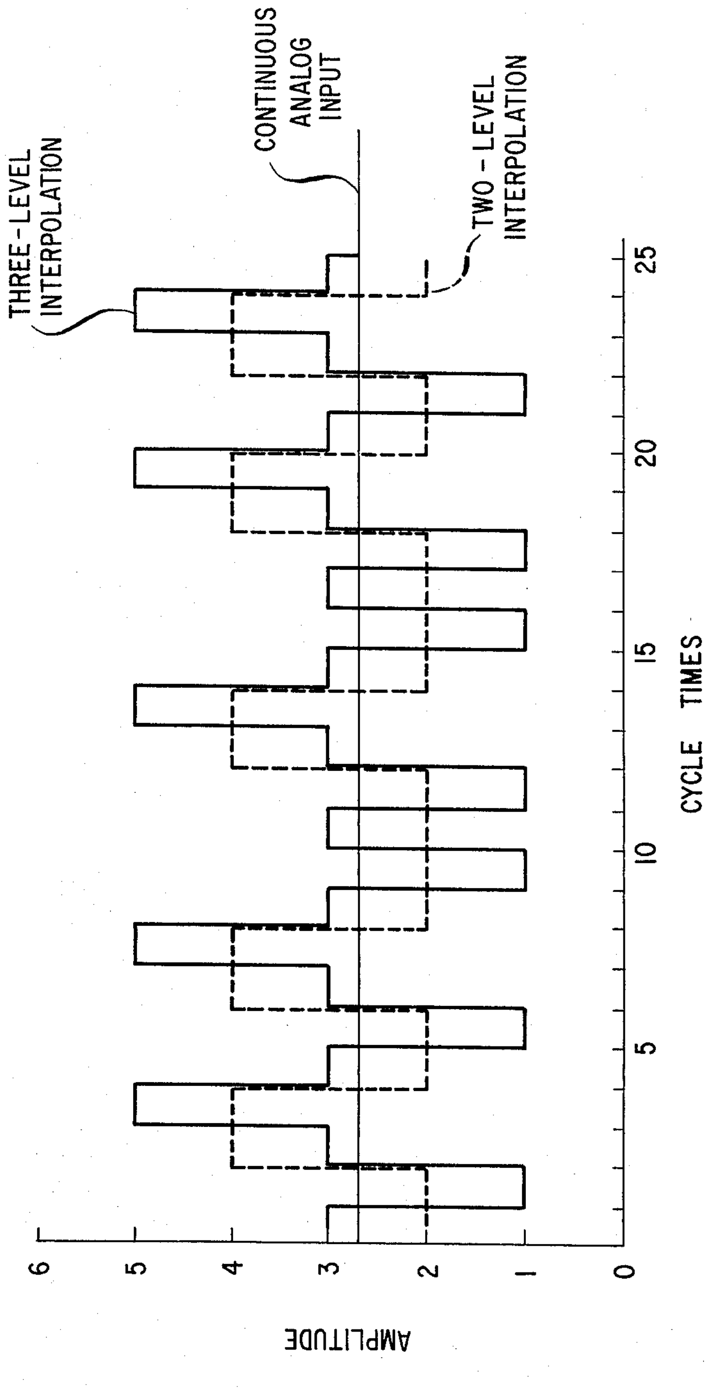
FIG. 4 includes wave diagrams illustrating response of the coder to slowly changing input analog signals.

FIG. 4 represents superimposed wave diagrams for comparing the 3-level interpolation type of operation of the coder of the present invention with the 2-level type of operation found in some prior art 1-bit coders. Prior delta modulation coders are capable of directing a feedback accumulator to step up or step down about the input amplitude, but they cannot direct the coder to remain in a given signal condition. Accordingly, they are incapable of accurately reproducing a constant, or slowly changing, input analog signal which has an average value across a Nyquist interval that is different from the average value of the bracketing coder approximation levels. Prior art coders generally have operated on a multibit basis to be capable of utilizing time interpolation in their operation to provide an accurate representation of an analog input over a wide range of amplitudes.

In FIG. 4 the dashed wave diagram is that which would be produced by a coder employing integration in the forward path and multibit digital output which can direct the coder approximation to remain at, or go to, any specified level. This is a two level interpolation. Thus, in FIG. 4 a constant analog input at 2.75 amplitude units is assumed along with the assumption that the multilevel coder can move between bracketing amplitude values of 2 and 4 in a uniform approximation arrangement. The 2-level representation is also assumed to operate on a sampling period which covers two cycle times on the time axis of FIG. 4. In this representation it is seen that the 2-level operation steps back and forth between its 2-unit and 4-unit levels in every sampling time except those at the cycle times 10 and 16, at which times the approximation remains at the 2-unit level in order to reduce the average value of the approximation from 3 down to 2.75.

By way of contrast, the solid line diagram of FIG. 4 represents 3-level interpolation as produced by the coder of FIG. 2. In this coder the combined employment of forward path integration and a direction command rate equal to the shift and sampling rates forces the discrete analog approximation to change in every sample time regardless of the rate of change of the input analog signal. It also causes the coder to operate in the 3-level fashion. For the purposes of FIG. 4, the 3-level coder can assume analog approximation levels of 1, 3, and 5 which bracket the levels of 2 and 4 assumed for the 2-level coder. These assumed levels represent a uniform coding rule rather than a companded coding rule to facilitate the FIG. 4 comparison, but the 3-level interpolation principle applies the same in either case.

The 3-level coder is operated at a higher sampling rate than is the 2-level coder so that it has one sample period for every cycle time on the time axis of FIG. 4. The higher rate is a trade-off to get comparable noise performance and the 1-bit coder simplicity without the multibit coder complexity. Because of the aforementioned clock rate relationships the coder must change discrete approximation levels on every sampling time; and because it is a 1-bit operation, it must go either up or down. In this operation, the 3-level coder of the invention initially brackets the analog input between its 1-unit and 3-unit levels. However, occasionally, e.g., at cycle times 3, 7, and 13, the 3-unit level coder jumps from the 3-unit to the 5-unit level for one sampling time in order to offset the effect on the discrete approximation average of the fact that the input analog signal at 2.75 units is very close to the 3-unit approximation level.

FIGS. 5A through 5G are diagrams which illustrate an additional feature of the coder of FIG. 2. In accordance with this aspect of the invention, the code inverting logic, comprising gates 108, 109, and 110 in FIG. 2A, is included in the forward signal path of the coder within the feedback loop; and it has been found, when so located, that the operation of the logic tends to curtail the effects of transmission errors, i.e., those induced by external effects, which may occur in the digital signal between the coder and decoder. Transmission errors within the coder or the decoder rarely occur, but they cause only momentary effects which are of negligible effect. Thus, this inverting logic serves in a digital fashion the function of a leakage resistance in an analog integrator, which leakage causes such transmission errors to be dissipated in a limited number of bit times rather than causing a permanent displacement between the operations of the encoder, feedback, analog approximation and the decoder analog approximation.

Figure 5A:
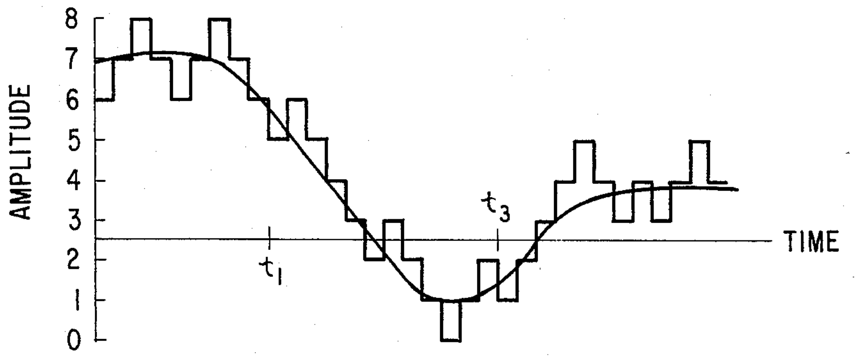
FIGS. 5A through 5G are a set of wave diagrams illustrating the effect of different forms of accumulator signaling upon the duration of transmission error effects.
Figure 5B:
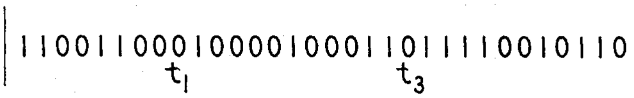
Figure 5C:
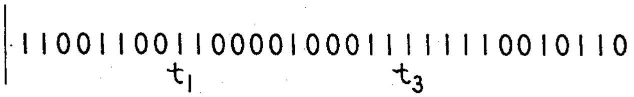

FIG. 5A illustrates a continuous analog signal variation and superimposed thereon the corresponding discrete analog approximation as produced by the FIG. 2A, 2B type of coder. Once more in this figure, however, for simplicity of illustration, a linear coding rule has been assumed rather than a companded rule; but the advantageous curtailing effect here considered is essentially the same in either case. That discrete analog approximation is also the same one, i.e., the desired approximation, shown in FIGS. 5D and 5G. FIG. 5B represents in binary ONE-ZERO fashion the contents of the 1-bit coder output signal train, without errors, which would produce the stepped analog approximation of FIG. 5A in a coder, wherein the mentioned inverting logic was included, for example, in the L-R direction control leads 21' of the feedback path instead of in the coder forward signal path. That is, the digital feedback integration function has no associated leakage. Thus, the polarity inversion effect is retained for bipolar signals, but the error curtailing effect is not retained. FIG. 5C includes the same information as FIG. 5B, but it further includes at times t1 and t3 transmission errors which have changed a binary ZERO bit to a binary ONE bit.

Figure 5D:
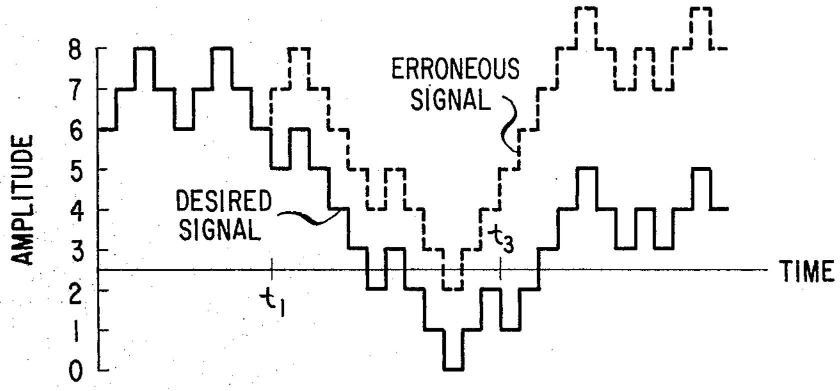

FIG. 5D illustrates, by the dotted wave diagram designated "erroneous signal," the effect of the transmission errors depicted in FIG. 5C on a coder which lacks the desired leakage function in either analog or digital form. Thus, the error signal occurring at time *t*1 actually causes the analog approximation to step up instead of down, as would be the case for the desired signal. This displacement between the erroneous signal and the desired signal persists indefinitely, in the absence of some form of leakage. Upon the occurrence of the second transmission error at time *t*3, which is of the same type as the first error at time *t*1, the displacement increases. Usually such errors occur in a system in a fashion so that they affect the discrete analog approximation produced in the decoder but do not affect the approximation produced in the coder. Consequently, there is a displacement of the type illustrated between those two approximations. Such displacements from desired signal conditions can cause noise in an analog signal reproduced at a decoder, particularly if a companded coding rule is employed as in the present invention.

Figure 5E:
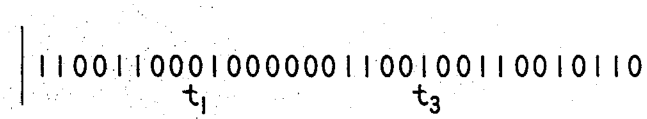

FIG. 5E illustrates in binary ONE-ZERO form the 1-bit coder signal output from the coder of FIGS. 2A and 2B which has the inverting logic in the forward signal path of the coder. This diagram presents the same information contained in FIG. 5B but with the modifications which reflect the different positioning of the inverting logic. Thus, it is seen that the digital signal in FIG. 5E is complemented, as compared to that in FIG. 5B, each time the analog input crosses the zero amplitude axis. FIG. 5G illustrates by the solid line wave diagram the desired discrete analog approximation that is produced by the digital information of FIG. 5E.

Figure 5F:
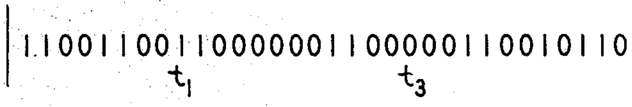
Figure 5G:
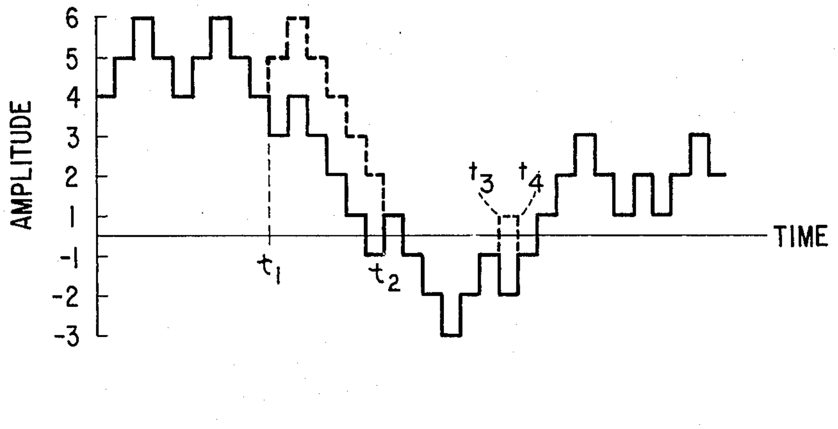

FIG. 5F represents the same information contained in FIG. 5E; but it includes, in addition, the two transmission errors at times *t*1 and *t*3 already mentioned in connection with FIG. 5C. However, the *t*3 error appears as a change from a binary ONE to a binary ZERO, in view of the complementing which occurred after the input analog signal crossed the zero amplitude axis for the first time. This erroneous digital information produces an analog approximation which conforms to the dotted wave diagram of FIG. 5G. Thus, there is after the time *t*1 error a displacement between the erroneous signal diagram and the desired signal diagram. However, at time *t*2, following the crossing of the analog signal into the negative amplitude region, the inversion in the logic brings the two signal approximation diagrams into concurrence; and there is no further displacement until the occurrence of the second error at time *t*3. Similarly, the effect of the second error is wiped out at time *t*4 following the next zero axis crossing of the input analog signal. These momentary displacements, as a result of transmission errors, in the diagram of FIG. 5G have been found to be imperceptible to the human ear for audio purposes when the sampling rate is high and the error rate is less than about one a second.

It will be observed in FIGS. 5A, and 5D that the amplitude scale extends upward from a zero amplitude level, which is at least as low as the maximum anticipated negative-going excursion of the input analog signal, rather than being located at an intermediate value in the range of variation of the analog signal. However, in FIG. 5G the scale extends positively and negatively from a zero amplitude level within the variation range of the continuous analog signal of FIG. 5A. The purpose of this scale difference is to facilitate a description of the effect of locating the digital inverting logic as shown in FIGS. 2A and 2B. Thus, it can be seen by comparing the diagrams of FIGS. 5A and 5B that a binary ONE in the digital signal train always causes the digital approximation to move in a positive-going direction regardless of whether the input analog signal is above or below the illustrated axis within the continuous analog signal variation range. Similarly in FIG. 5A, a binary ZERO signal always causes the approximation to move in a negative-going direction. The same is true of FIG. 5D. However, in FIG. 5G it will be seen, by comparing the wave diagrams there with the diagram of FIG. 5E, that the placement of the digital inverting logic, as shown in FIGS. 2A and 2B, i.e., in the forward signal path, now causes a binary ONE in the digital signal train to drive the digital approximation away from the continuous analog intermediate reference axis regardless of whether the approximation is above or below that axis. Similarly, a binary ZERO always drives the analog approximation toward the same analog reference axis. Thus, it is sometimes said that the feedback signals in the FIG. 2 coder provide inside signaling to the feedback accumulation circuits, since the effects of binary ONE and ZERO signals are referred to an amplitude axis which is within the analog signal variation range. Likewise, for the hypothetically modified coder configuration represented by FIGS. 5A and 5D the feedback signals are sometimes said to provide outside signaling because they direct the feedback accumulator with reference to an axis which is outside of the amplitude variation range of the input analog signal.

Although the present invention has been described in connection with a particular illustrative embodiment, it is to be understood that other embodiments, modifications, and applications thereof which will be apparent to those skilled in the art are included within the spirit and scope of the invention.

It will also be seen that starting from the left, i.e., zero time point in the diagram, the continuous analog signal is greater than the approximation at the early decision times; and the analog approximation steps up every sample time until the fourth sample time beginning at time *t*1. At that point the discrete approximation prior to time *t*1 is above the input analog waveform but the approximation steps up nevertheless. This action results from the fact that the integrated error signal from prior sample periods, when the continuous analog signal was the larger one, is not immediately offset by the relatively short time before the *t*1 decision when it was the smaller. Such operation ensures that the average value of the discrete signal equals the average continuous analog signal. A similar apparent excursion in the incorrect direction by the approximation occurs in the negative-going direction at time *t*2; and other seemingly incorrect excursions in one direction or the other occur at several other places in the diagram. These excursions represent different examples of the 3-level type of interpolation previously mentioned in connection with FIG. 1 for slow inputs.

At time *t*3 it can be seen that the input analog signal is beginning to level off at amplitudes in the low to middle 40s. Here again is evidence of the 3-level type of interpolating operation in that the coder discrete approximation normally moves between its steps at 41⅔ and 84⅓ amplitude units, respectively, for such an analog signal. However, occasional negative-going excursions outside of those bracketing amplitude levels to the level 20⅓, such as the excursion at time *t*3, are required in order to force the average value of the approximation to conform more closely to the input continuous analog value.

Between times *t*4 and *t*5 there is a period of possible instability in the coder following the discrete approximation excursion to the 84⅓ level, while the input analog signal was at a level of about 30 units with negative slope. Although it is possible that the excursion between time *t*4 and *t*5 is a more complicated extension of 3-level interpolation to offset the aforementioned positive-going excursion, it could also be a case of instability in the coder operation. Even in the latter case, it is apparent that the coder recovered rapidly from the possible instability in a time interval of only about five sample times, which is a relatively short time in terms of the Nyquist period of the input analog signal. Experience with the illustrated coder has indicated that excursions such as that between times *t*4 and *t*5 rarely occur for the indicated analog signal configuration, but that, assuming instability, they represent the worst case encountered; and such excursions are smoothed out in the low-pass filter 32 and are not heard in the reproduced voice signal at a decoder output.

FIG. 4 represents superimposed wave diagrams for comparing the 3-level interpolation type of operation of the coder of the present invention with the 2-level type of operation found in some prior art 1-bit coders. Prior delta modulation coders are capable of directing a feedback accumulator to step up or step down about the input amplitude, but they cannot direct the coder to remain in a given signal condition. Accordingly, they are incapable of accurately reproducing a constant, or slowly changing, input analog signal which has an average value across a Nyquist interval that is different from the average value of the bracketing coder approximation levels. Prior art coders generally have operated on a multibit basis to be capable of utilizing time interpolation in their operation to provide an accurate representation of an analog input over a wide range of amplitudes.

In FIG. 4 the dashed wave diagram is that which would be produced by a coder employing integration in the forward path and multibit digital output which can direct the coder approximation to remain at, or go to, any specified level. This is a two level interpolation. Thus, in FIG. 4 a constant analog input at 2.75 amplitude units is assumed along with the assumption that the multilevel coder can move between bracketing amplitude values of 2 and 4 in a uniform approximation arrangement. The 2-level representation is also assumed to operate on a sampling period which covers two cycle times on the time axis of FIG. 4. In this representation it is seen that the 2-level operation steps back and forth between its 2-unit and 4-unit levels in every sampling time except those at the cycle times 10 and 16, at which times the approximation remains at the 2-unit level in order to reduce the average value of the approximation from 3 down to 2.75.

By way of contrast, the solid line diagram of FIG. 4 represents 3-level interpolation as produced by the coder of FIG. 2. In this coder the combined employment of forward path integration and a direction command rate equal to the shift and sampling rates forces the discrete analog approximation to change in every sample time regardless of the rate of change of the input analog signal. It also causes the coder to operate in the 3-level fashion. For the purposes of FIG. 4, the 3-level coder can assume analog approximation levels of 1, 3, and 5 which bracket the levels of 2 and 4 assumed for the 2-level coder. These assumed levels represent a uniform coding rule rather than a companded coding rule to facilitate the FIG. 4 comparison, but the 3-level interpolation principle applies the same in either case.

The 3-level coder is operated at a higher sampling rate than is the 2-level coder so that it has one sample period for every cycle time on the time axis of FIG. 4. The higher rate is a trade-off to get comparable noise performance and the 1-bit coder simplicity without the multibit coder complexity. Because of the aforementioned clock rate relationships the coder must change discrete approximation levels on every sampling time; and because it is a 1-bit operation, it must go either up or down. In this operation, the 3-level coder of the invention initially brackets the analog input between its 1-unit and 3-unit levels. However, occasionally, e.g., at cycle times 3, 7, and 13, the 3-unit level coder jumps from the 3-unit to the 5-unit level for one sampling time in order to offset the effect on the discrete approximation average of the fact that the input analog signal at 2.75 units is very close to the 3-unit approximation level.

FIGS. 5A through 5G are diagrams which illustrate an additional feature of the coder of FIG. 2. In accordance with this aspect of the invention, the code inverting logic, comprising gates 108, 109, and 110 in FIG. 2A, is included in the forward signal path of the coder within the feedback loop; and it has been found, when so located, that the operation of the logic tends to curtail the effects of transmission errors, i.e., those induced by external effects, which may occur in the digital signal between the coder and decoder. Transmission errors within the coder or the decoder rarely occur, but they cause only momentary effects which are of negligible effect. Thus, this inverting logic serves in a digital fashion the function of a leakage resistance in an analog integrator, which leakage causes such transmission errors to be dissipated in a limited number of bit times rather than causing a permanent displacement between the operations of the encoder, feedback, analog approximation and the decoder analog approximation.

FIG. 5A illustrates a continuous analog signal variation and superimposed thereon the corresponding discrete analog approximation as produced by the FIG. 2A, 2B type of coder. Once more in this figure, however, for simplicity of illustration, a linear coding rule has been assumed rather than a companded rule; but the advantageous curtailing effect here considered is essentially the same in either case. That discrete analog approximation is also the same one, i.e., the desired approximation, shown in FIGS. 5D and 5G. FIG. 5B represents in binary ONE-ZERO fashion the contents of the 1-bit coder output signal train, without errors, which would produce the stepped analog approximation of FIG. 5A in a coder, wherein the mentioned inverting logic was included, for example, in the L-R direction control leads 21' of the feedback path instead of in the coder forward signal path. That is, the digital feedback integration function has no associated leakage. Thus, the polarity inversion effect is retained for bipolar signals, but the error curtailing effect is not retained. FIG. 5C includes the same information as FIG. 5B, but it further includes at times t1 and t3 transmission errors which have changed a binary ZERO bit to a binary ONE bit.

FIG. 5D illustrates, by the dotted wave diagram designated "erroneous signal," the effect of the transmission errors depicted in FIG. 5C on a coder which lacks the desired leakage function in either analog or digital form. Thus, the error signal occurring at time *t1* actually causes the analog approximation to step up instead of down, as would be the case for the desired signal. This displacement between the erroneous signal and the desired signal persists indefinitely, in the absence of some form of leakage. Upon the occurrence of the second transmission error at time *t3*, which is of the same type as the first error at time *t1*, the displacement increases. Usually such errors occur in a system in a fashion so that they affect the discrete analog approximation produced in the decoder but do not affect the approximation produced in the coder. Consequently, there is a displacement of the type illustrated between those two approximations. Such displacements from desired signal conditions can cause noise in an analog signal reproduced at a decoder, particularly if a companded coding rule is employed as in the present invention.

FIG. 5E illustrates in binary ONE-ZERO form the 1-bit coder signal output from the coder of FIGS. 2A and 2B which has the inverting logic in the forward signal path of the coder. This diagram presents the same information contained in FIG. 5B but with the modifications which reflect the different positioning of the inverting logic. Thus, it is seen that the digital signal in FIG. 5E is complemented, as compared to that in FIG. 5B, each time the analog input crosses the zero amplitude axis. FIG. 5G illustrates by the solid line wave diagram the desired discrete analog approximation that is produced by the digital information of FIG. 5E.

FIG. 5F represents the same information contained in FIG. 5E; but it includes, in addition, the two transmission errors at times *t1* and *t3* already mentioned in connection with FIG. 5C. However, the *t3* error appears as a change from a binary ONE to a binary ZERO, in view of the complementing which occurred after the input analog signal crossed the zero amplitude axis for the first time. This erroneous digital information produces an analog approximation which conforms to the dotted wave diagram of FIG. 5G. Thus, there is after the time *t1* error a displacement between the erroneous signal diagram and the desired signal diagram. However, at time *t2,* following the crossing of the analog signal into the negative amplitude region, the inversion in the logic brings the two signal approximation diagrams into concurrence; and there is no further displacement until the occurrence of the second error at time *t3.* Similarly, the effect of the second error is wiped out at time *t4* following the next zero axis crossing of the input analog signal. These momentary displacements, as a result of transmission errors, in the diagram of FIG. 5G have been found to be imperceptible to the human ear for audio purposes when the sampling rate is high and the error rate is less than about one a second.

It will be observed in FIGS. 5A, and 5D that the amplitude scale extends upward from a zero amplitude level, which is at least as low as the maximum anticipated negative-going excursion of the input analog signal, rather than being located at an intermediate value in the range of variation of the analog signal. However, in FIG. 5G the scale extends positively and negatively from a zero amplitude level within the variation range of the continuous analog signal of FIG. 5A. The purpose of this scale difference is to facilitate a description of the effect of locating the digital inverting logic as shown in FIGS. 2A and 2B. Thus, it can be seen by comparing the diagrams of FIGS. 5A and 5B that a binary ONE in the digital signal train always causes the digital approximation to move in a positive-going direction regardless of whether the input analog signal is above or below the illustrated axis within the continuous analog signal variation range. Similarly in FIG. 5A, a binary ZERO signal always causes the approximation to move in a negative-going direction. The same is true of FIG. 5D. However, in FIG. 5G it will be seen, by comparing the wave diagrams there with the diagram of FIG. 5E, that the placement of the digital inverting logic, as shown in FIGS. 2A and 2B, i.e., in the forward signal path, now causes a binary ONE in the digital signal train to drive the digital approximation away from the continuous analog intermediate reference axis regardless of whether the approximation is above or below that axis. Similarly, a binary ZERO always drives the analog approximation toward the same analog reference axis. Thus, it is sometimes said that the feedback signals in the FIG. 2 coder provide inside signaling to the feedback accumulation circuits, since the effects of binary ONE and ZERO signals are referred to an amplitude axis which is within the analog signal variation range. Likewise, for the hypothetically modified coder configuration represented by FIGS. 5A and 5D the feedback signals are sometimes said to provide outside signaling because they direct the feedback accumulator with reference to an axis which is outside of the amplitude variation range of the input analog signal.

Although the present invention has been described in connection with a particular illustrative embodiment, it is to be understood that other embodiments, modifications, and applications thereof which will be apparent to those skilled in the art are included within the spirit and scope of the invention.

What is claimed is:

1. In a differential pulse code system, an encoder comprising an analog subtraction circuit having a first input for receiving an analog signal to be converted to digital format, and having a second input for receiving a discrete analog approximation of the digital format, means for integrating a difference output signal from said subtraction circuit, means for producing an output pulse in response to each attainment of a predetermined threshold amplitude by an output signal from said integrating means, the output from said producing means comprising said digital format, one or the other of a pulse state or a no-pulse state in said producing means output indicating an increasing analog signal and the other of such states indicating a decreasing analog signal, means responsive to said pulses for digitally accumulating increasing and decreasing pulse state information represented by said digital format to produce a continuous digital summation of analog signal increases and decreases, and means for applying an analog representation of the contents of said digital accumulating means to said second input as said analog approximation of said digital format.

2. The system in accordance with claim 1 in which said producing means is a 1-bit trigger circuit, and said applying means comprises means for converting each summation in said accumulating means to an analog signal having an amplitude corresponding to the binary value of said summation.

3. The system in accordance with claim 2 in which said accumulating means includes means for forming said summation in accordance with a binary companded form of coding, and means are provided for receiving a clock signal to enable said trigger circuit at a rate which is at least equal to the product of the Nyquist rate for anticipated analog signals to be converted and the number of amplitude intervals per segment of a piecewise linear approximation pulse code in said companded form of coding.

4. The system in accordance with claim 3 in which said receiving means receives a clock signal which is twice the rate of said product.

5. The system in accordance with claim 1 in which said accumulating means comprises a reversible shift register, and means for operating said shift register in one direction or the other in response to first and second predetermined signal states, respectively, at the output of said producing means.

6. The system in accordance with claim 1 in which there is provided in addition a decoder coupled to said encoder and comprising means responsive to said pulses for digitally accumulating said increasing and decreasing pulse state information represented by said digital format, and means responsive to outputs of said decoder accumulating means for producing a further discrete analog approximation of said analog signal.

7. The system in accordance with claim 1 in which said integrating means includes means fixing a substantially uniform integration characteristic extending over a frequency range between the low frequencies of interest in said analog signal to be converted and the frequency at which said producing means are periodically enabled.

8. The system in accordance with claim 1 in which said producing means has a predetermined range of variation in said threshold amplitude, and said subtraction circuit and said integrating means include means for providing sufficient gain so that a signal step of the smallest size in said discrete analog approximation produces in said output from said integrating means a signal change much greater than said variation range.

9. In a differential pulse code system, digital signal decoding means comprising a reversible shift register having an input connection for application of shift clock signals means, including said shift register, for accumulating information represented by a differential pulse coded signal train, said accumulating means comprises means responsive to said pulse coded signal train for controlling shifting direction in said shift register to shift in a first direction in response to a pulse signal state in said train and to shift in a second direction in response to a no-pulse signal state in said train, said signal train including a succession of signal bit times recurring at the same rate as said clock signals, and means for deriving from said shift register a discrete analog approximation signal having in each bit time an amplitude corresponding to the binary coded value of the contents of said shift register at that time.

10. The system in accordance with claim 9 in which there are provided in said accumulating means means for entering binary ONE signal bits into the least significant stage or said shift register during shifting operations from the least significant stage toward the most significant stage, and means for inserting a binary ZERO into the most significant stage of said shift register during each shifting operation from the most significant stage toward the least significant stage.

11. The system in accordance with claim 9 in which there is provided in the deriving means a resistance ladder network having input connections from respective stages of said shift register and having an output connection from an end of said ladder network at the most significant stage position of said shift register for deriving from said network a discrete analog approximation of information represented by said signal train.

12. The system in accordance with claim 11 in which said ladder network is an R/2R type of resistance ladder network driven by bit-parallel outputs of said shift register.

13. The system in accordance with claim 11 in which said network includes input connections comprising first selectively actuatable means for coupling to said ladder network true outputs of said shift register stages, second selectively actuatable means for coupling to said ladder network complement outputs of said shift register stages, means for extracting from the least significant bit stage of said shift register a signal indicating a predetermined binary signal state therein, and means, responsive to different states of said indicating signal, for either actuating only said second selectively actuatable means or both actuating said first selectively actuatable means and forcing said second selectively actuatable means to a predetermined signal state for providing a corresponding fixed pedestal signal to said ladder network.

14. The system in accordance with claim 13 in which said ladder network includes a resistor connected between ground and the least significant bit end of said network, and said first selectively actuatable means includes means, responsive to actuation of such first selectively actuatable means, for supplying in parallel with said grounded resistor a signal of a magnitude which is sufficient to establish said pedestal at a small positive value.

15. The system in accordance with claim 9 in which there are provided in said accumulating means means, responsive to a binary ONE signal state in a most significant bit stage of said register, for forcing said register to shift from the most significant stage toward the least significant stage.

16. The system in accordance with claim 9 in which there are provided in said accumulating means means for selectably inverting the signal state of said pulse coded signal train, and means, responsive to a predetermined signal state of the least significant bit stage of said shift register in coincidence with a signal state in said signal train directing a shift toward said stage, for actuating said inverting means.

17. The system in accordance with claim 9 in which there are provided an additional reversible shift register having an input connection for application of shift clock signals in synchronism with said signal train, and means, responsive to said pulse coded signal train, for controlling shifting direction in said additional shift register whereby the contents of said additional shift register comprise a binary coded representation of the analog information underlying said signal train.

18. The system in accordance with claim 9 in which there are provided in combination with said decoding means means for producing a difference error signal in response to a continuous analog signal and said discrete analog approximation signal, and means, responsive to said error signal, for producing said pulse coded signal train to represent variations in said error signal.

19. The system in accordance with claim 18 in which said pulse coded signal train producing means comprises means for integrating said error signal, and means, periodically enabled at said signal train bit rate, for producing an output pulse in response to at least a predetermined threshold amplitude of an output of said integrating means.

20. The system in accordance with claim 19 in which said integrating means includes means for establishing an integrating response characteristic in said integrating means over a frequency band extending approximately from low frequencies of a frequency band of interest in said continuous analog signal to the frequency at which said producing means are periodically enabled.

21. The system in accordance with claim 18 in which said signal train producing means has a predetermined input signal amplitude threshold which must be attained to produce a pulse in said train, said threshold being subject to a predetermined range of variation in amplitude, and said error signal producing means includes means for providing sufficient gain to said analog approximation so that a step of the smallest size in said approximation produces in said error signal a change that is much greater than said variation range.

22. The system in accordance with claim 18 in which said shift register accumulates a digital approximation of said continuous analog signal in response to said pulse coded signal train, and means are provided for complementing said signal train in response to a change in polarity of said digital approximation.

23. The system in accordance with claim 22 in which said complementary means comprises means, responsive to coincidence of a binary ZERO in the least significant bit stage of said register and of a signal state in said signal train directing said register to shift its contents toward said least significant bit stage, for producing a polarity change signal, and means for inverting said signal train in response to said polarity change signal, and said deriving means includes means, responsive to said polarity change signal, for changing polarity of said analog approximation.

24. The system in accordance with claim 23 in which there are provided means for biasing the continuous analog signal input and the analog approximation signal input of said error signal producing means toward opposite polarity states, and means responsive to said polarity change signal to control said biasing means for fixing the relative polarities of said opposite polarity states.

25. The system in accordance with claim 18 in which there are provided a further reversible shift register having an input connection for application of shift clock signals in synchronism with said signal train, means responsive to said pulse coded signal train for controlling shifting direction in said further shift register, and means responsive to outputs of said further shift register for producing a further approximation of said analog signal.

* * * * *

UNITED STATES PATENT AND TRADEMARK OFFICE

CERTIFICATE OF CORRECTION

PATENT NO. : 3,925,731

DATED : December 9, 1975

INVENTOR(S) : Ralph C. Brainard and James C. Candy

It is certified that error appears in the above-identified patent and that said Letters Patent are hereby corrected as shown below:

In the specification, column 12, line 13, "Q", second occurrence, should read --$\bar{Q}$--. Column 15, line 44, "a", first occurrence, should read --ac--; line 45, "a" should read --ac--.

In claim 10, column 22, line 38, "or" should read --of--.

Signed and Sealed this

*twenty-third* Day of *March 1976*

[SEAL]

*Attest:*

RUTH C. MASON
*Attesting Officer*

C. MARSHALL DANN
*Commissioner of Patents and Trademarks*